United States Patent
Zhu et al.

(10) Patent No.: US 11,452,149 B2
(45) Date of Patent: Sep. 20, 2022

(54) SYSTEM AND METHOD OF RECOVERING PAIRING INFORMATION OF WIRELESS DEVICES

(71) Applicant: Beken Corporation, Shanghai (CN)

(72) Inventors: Lizhen Zhu, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 588 days.

(21) Appl. No.: 16/551,504

(22) Filed: Aug. 26, 2019

(65) Prior Publication Data

US 2021/0045167 A1 Feb. 11, 2021

(30) Foreign Application Priority Data

Aug. 5, 2019 (CN) .......................... 201910717985.2

(51) Int. Cl.
*H04W 76/11* (2018.01)
*G06F 13/42* (2006.01)
*H04W 76/19* (2018.01)
*H04W 76/14* (2018.01)

(52) U.S. Cl.
CPC ......... *H04W 76/11* (2018.02); *G06F 13/4282* (2013.01); *H04W 76/19* (2018.02); *G06F 2213/0042* (2013.01); *H04W 76/14* (2018.02)

(58) Field of Classification Search
CPC ..... H04W 76/11; H04W 76/19; H04W 76/14; H04W 84/18; H04W 76/18; G06F 13/4282; G06F 2213/0042
See application file for complete search history.

(56) References Cited

U.S. PATENT DOCUMENTS

| | | | |
|---|---|---|---|
| 2005/0152294 A1* | 7/2005 | Yu | H04M 1/72412 370/310 |
| 2009/0222659 A1* | 9/2009 | Miyabayashi | H04L 63/0823 713/175 |
| 2010/0029205 A1* | 2/2010 | Lu | H04W 12/06 455/41.2 |
| 2014/0239852 A1* | 8/2014 | Kim | H05B 47/19 315/312 |
| 2015/0264732 A1* | 9/2015 | Satoh | H04W 12/04 455/41.1 |
| 2020/0019255 A1* | 1/2020 | Gilbert | H04W 4/80 |

* cited by examiner

*Primary Examiner* — Christopher P Grey
(74) *Attorney, Agent, or Firm* — Schwegman Lundberg & Woessner, P.A.

(57) ABSTRACT

A system for recovering pairing information of wireless devices is provided. The system may include a first device (such as a mouse) and a second device (such as a dongle) that are wirelessly paired. The system can determine a pairing information damage in one of the first device and the second device, and can automatically recover the pairing information without even noticed by the user. In this way, the system can be less affected by the pairing information damage, and can have extended product life and improved customer experience.

19 Claims, 3 Drawing Sheets

SYSTEM AND METHOD OF RECOVERING PAIRING INFORMATION OF WIRELESS DEVICES

CROSS REFERENCE TO RELATED APPLICATIONS

The present application claims priority to and incorporates by reference Chinese patent application no. 201910717985.2 filed Aug. 5, 2019.

TECHNICAL FIELD

The present application relates to a system and a method of recovering pairing information among wireless devices, particularly to a system and a method of recovering pairing information between a wireless mouse and a wireless dongle.

BACKGROUND

Paired wireless devices are widely used in communication systems. For example, a wireless mouse and a dongle are typically used in pair. However, due to various reasons, the pairing information of the mouse and the dongle may be damaged, may lead to fail to establish a pairing between the mouse and the dongle, and thus may cause the mouse and the dongle useless. Thus, a mechanism of recovering pairing information among wireless devices becomes highly desirable.

BRIEF DESCRIPTION OF THE APPLICATION

According to an embodiment, a system may comprise a first device comprising a first storage, and a second device comprising a second storage and configured to wirelessly communicate with the first device, wherein each of the first device and the second device stores a first device identification, a second device identification, a first device standard code calculated as a function of the first device identification by using a calculation algorithm, and a second device standard code calculated as a function of the second device identification by using the calculation algorithm.

According to an embodiment, a method of recovering wireless pairing information of a first device and a second device is provided. The first device and the second device each may store a first device identification, a second device identification, a first device standard code calculated as a function of the first device identification using an algorithm, and a second device standard code calculated as a function of the second device identification using the algorithm. The method may comprise under a condition, using the algorithm by the first device, calculating a first device checking code as a function of the first device identification, and a second device checking code as a function of the second device identification; determining by the first device whether the first device checking code matching the first device standard code, and whether the second device checking code matching the second device standard code; responsive to determining no matching between the first device checking code and the first device standard code, obtaining by the first device a copy of the first device identification from the second device, and saving the copy of the first device identification in the first device; and responsive to determining no matching between the second testing code and the second device standard code, obtaining by the first device a copy of the second device identification from the second device, and saving the copy of the second device identification in the first device.

According to an embodiment, a method of recovering wireless pairing information of a first device and a second device is provided. The first device and the second device each may stores a first device identification, a second device identification, a first device standard code calculated as a function of the first device identification using an algorithm, and a second device standard code calculated as a function of the second device identification using the algorithm. The method may comprise using the algorithm by the second device, calculating a first device checking code as a function of the first device identification, and a second device checking code as a function of the second device identification; determining by the second device whether the first device checking code matching the first device standard code, and whether the second device checking code matching the second device standard code; responsive to determining no matching between the first device checking code and the first device standard code, obtaining by the second device a copy of the first device identification from the first device, and saving the copy of the first device identification in the second device; and responsive to determining no matching between the second checking code and the second device standard code, obtaining by the second device a copy of the second device identification from the first device, and saving the copy of the second device identification in the second device.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Figure 1:
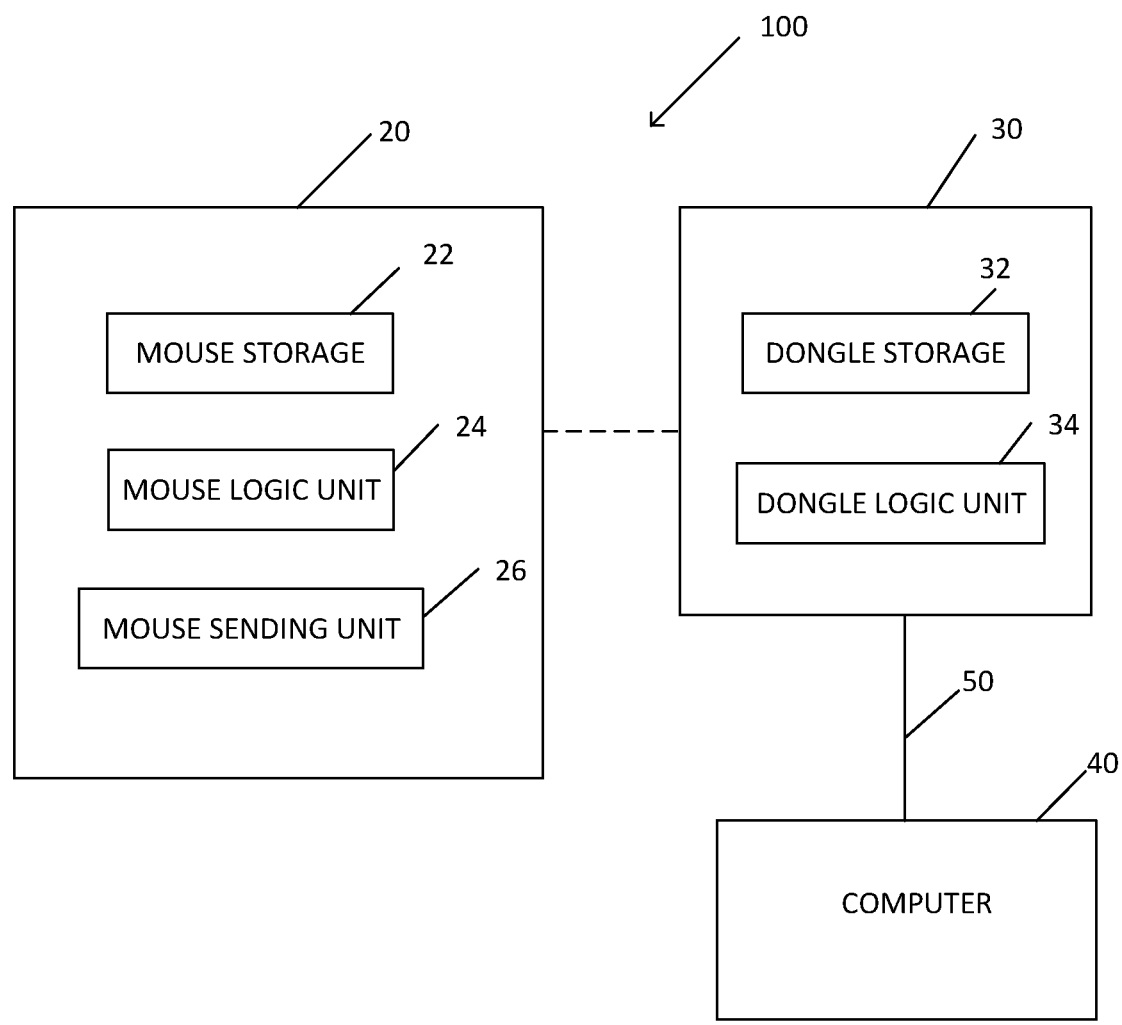
FIG. 1 is a block diagram illustrating a system of recovering pairing information of wirelessly communicated devices according to an embodiment.

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking a system and a method of recovering pairing information of wirelessly communicated devices as example. Those of ordinary skills in the art understand that this is only to describe the application clearly and adequately, rather than limit the scope of the application, which is defined by the appended claims.

A wireless system may include both a wireless mouse and a wireless dongle to be used in pair. A dongle is a small piece of computer hardware that connects to a port of another device to enable a pass-through to such a device that adds functionality. In operation, the dongle may be plugged into a computer via a Universal Serial Bus (USB) for example. Pairing with the dongle, the mouse may wirelessly communicate with the computer via the dongle.

Wireless communication can be carried on by passing information between a mouse and a dongle that are paired. For example, the information generally may have a specific frame structure, which may include e.g., a dongle access identification address of a dongle in front of the information to be passed. The access identification address of the information can be used by the dongle as an identification domain to identify whether the information is sent to itself. This access identification address can be a globally unique serial number (typically consisting of 24-bit or 32-bit) written to the dongle during production.

Typically, in order to pair, the mouse may first use a public address to send a pair request to the dongle, the dongle will reply to the mouse with a globally unique serial number of the dongle, and then the mouse will receive and store the globally unique serial number of the dongle. After that, the mouse will transmit information by only using this globally unique serial number received from the mouse, and the dongle will only receive information having this globally unique serial number. Thus, the pairing between the mouse and the dongle is completed, and during usage no interference may occur between this mouse and other mice.

However, due to various reasons, it is possible that the globally unique serial number coming from the dongle side and stored in the mouse to be lost. It is even possible that the globally unique serial number stored at the dongle side to be lost. If this happens, the mouse and the dongle will be useless and unrepairable, and thus will lead to poor user experience and affect the reputation of the manufacturer.

FIG. 1 is a block diagram illustrating a system 100 of recovering pairing information of wirelessly communicated devices according to an embodiment of the application. The system 100 may include a first device 20 and a second device 30 that can be paired to wirelessly communicate each other while working.

The first device 20 can be a wireless mouse, the second device 30 can be a wireless dongle that can be plugged into a computer 40 via a USB 50. Once paired with the dongle 30, the mouse 20 can wirelessly communicate with the computer 40 via the dongle 30. The first device 20 and the second device 30 can be other wireless devices, and not limited to a mouse and a dongle.

The mouse 20 may include a mouse storage 22, a mouse logic unit 24, and a mouse sensing unit 26 that can sense a motion of the mouse 20 and a pressure (such as a right click and a left click) on the mouse 20 for example. The dongle 30 may include a dongle storage 32 and a dongle logic unit 34. The mouse logic unit 24, the mouse sensing unit 26, and the dongle logic unit 34 can be either software modules or hardware circuits.

In the system 100, the mouse 20 and the dongle 30 respectively store, in the mouse storage 22 and the dongle storage 32, pairing information such as a mouse identification ID1, a dongle identification ID2, a mouse standard code SC1 that is initially calculated as a function of the mouse identification ID1 by using a calculation algorithm (ALG), and a dongle standard code SC2 that is initially calculated as a function of the dongle identification ID2 by using the calculation algorithm (ALG). The mouse identification ID1 and the dongle identification ID2 are globally unique identification numbers that can be used to identify the mouse 20 and the dongle 30.

In an embodiment, the calculation algorithm (ALG) can perform calculations, such as Cyclic Redundancy Check (CRC) operations, on the mouse identification ID1 and the dongle identification ID2, and then can get results. The CRC operations are polynomial operations on a series of binary numbers to get results. The calculation algorithm (ALG) can be installed in the mouse logic unit 24 and the dongle logic unit 34 of the system 100. However, the calculation algorithm ALG may not be limited to be installed in the mouse logic unit 24 and the dongle logic unit 34 of the system 100.

During manufacturing, the mouse 20 is written with a mouse identification ID1, and the dongle 30 is written with a dongle identification ID2. At a pairing stage, the mouse 20 and the dongle 30 may exchange their identifications (globally unique serial numbers). For example, the mouse 20 may obtain the dongle identification ID2 from the dongle 30, and may store that in the mouse 20. Likewise, the dongle 30 may obtain the mouse identification ID1 from the mouse 20, and may store that in the dongle 30. Therefore, the mouse 20 and the dongle 30 each may store both the mouse identification ID1 and the dongle identification ID2.

In terms of probability, having both the mouse-side serial number ID1 and the dongle-side serial number ID2 in the mouse 20, supposed the probability of loss of either the mouse-side serial number ID1 or the dongle-side serial number ID2 in the mouse 20 is $1/1000$, the probability of simultaneous loss of both the mouse-side serial number ID1 and the dongle-side serial number ID2 in the mouse 20 becomes $1/1000000$, which can be ignored. Likewise, the probability of simultaneous loss of both the mouse-side serial number ID1 and the dongle-side serial number ID2 in the dongle 30 also becomes $1/1000000$, which can be ignored.

During this pairing stage at the factory, the mouse identification ID1 and the dongle identification ID2 as well as the initially calculated mouse standard code SC1 and dongle standard code SC2 can be stored in the mouse storage 22 of the mouse 20 and the dongle storage 32 of the dongle 30 respectively.

Alternatively, during this pairing stage at the factory, the mouse identification ID1 and the dongle identification ID2 as well as the initially calculated mouse standard code SC1 and dongle standard code SC2 can be first stored in the mouse 20, and then be sent to and stored in the dongle 30.

After leaving the factory, a damage of one of the mouse identification ID1 and the dongle identification ID2 in one of the mouse 20 and the dongle 30 can be detected and can be automatically repaired, which will be explained in more detailed below.

In an embodiment, after leaving the factory, to detect a damage of the mouse identification ID1 or the dongle identification ID2, calculations using the same calculation algorithm (ALG) can be performed again in the mouse 20 or in the dongle 30 to get a mouse checking code CC1 as a function of the mouse identification ID1 and a dongle checking code CC2 as a function of the dongle identification ID2, and then to respectively compare with the mouse standard code SC1 and dongle standard code SC2 stored in the mouse 20 or in the dongle 30. The calculation algorithm (ALG) is the same algorithm that is used to initially calculate the mouse standard code SC1 and dongle standard code SC2.

When a mouse sensing unit 26 of the mouse 20 detects a motion of the mouse 20 or a pressure on the mouse 20, the mouse 20 is triggered to start detecting a possible damage of the mouse identification ID1 or the dongle identification ID2 in the mouse 20.

In the mouse 20, if the calculated mouse checking code CC1 and the stored mouse standard code SC1 are determined by the logic unit 24 of the mouse 20 to be identical (match), the mouse identification ID1 in the mouse 20 is determined undamaged. Otherwise, in the mouse 20, if the calculated mouse checking code CC1 and the stored mouse standard code SC1 are determined by the logic unit 24 of the mouse 20 to be not identical (do not match), the mouse identification ID1 in the mouse 20 is determined damaged, and a repair of the damaged mouse identification ID1 in the mouse 20 will be needed.

When a damage of the mouse identification ID1 in the mouse 20 is determined, the mouse 20 may communicate with the dongle 30, obtain a copy of a mouse identification ID1 from the dongle 30, and store the copy of the mouse identification ID1 in the mouse 20 to replace the damaged mouse identification ID1. Similarly, when a damage of the dongle identification ID2 in the mouse 20 is determined, the mouse 20 may communicate with the dongle 30, obtain a copy of a dongle identification ID2 from the dongle 30, and store the copy of the dongle identification ID2 in the mouse 20 to replace the damaged dongle identification ID2.

In an embodiment, the dongle 30 is configured to periodically start checking whether the mouse identification ID1 or the dongle identification ID2 stored in the dongle 30 is damaged. In another embodiment, responsive to being plugged into a computer 40 via a USB 50, the dongle 30 is configured to start checking whether the mouse identification ID1 or the dongle identification ID2 stored in the dongle 30 is damaged.

Likewise, in the dongle 30, if the calculated mouse checking code CC1 and the stored mouse standard code SC1 are determined by the logic unit 34 of the dongle 30 to be identical (match), the mouse identification ID1 in the dongle 30 is determined undamaged. Otherwise, in the dongle 30, if the calculated mouse checking code CC1 and the stored mouse standard code SC1 are determined by the logic unit 34 of the dongle 30 to be not identical (do not match), the mouse identification ID1 in the dongle 30 is determined damaged, and a repair of the damaged mouse identification ID1 in the dongle 30 will be needed.

When a damage of the mouse identification ID1 in the dongle 30 is determined, the dongle 30 may communicate with the mouse 20, obtain a copy of a mouse identification ID1 from the mouse 20, and store the copy of the mouse identification ID1 in the dongle 30 to replace the damaged mouse identification ID1. Similarly, when a damage of the dongle identification ID2 in the dongle 30 is determined, the dongle 30 can communicate with the mouse 20, obtain a copy of a dongle identification ID2 from the mouse 20, and store the copy of the dongle identification ID2 in the dongle 30 to replace the damaged dongle identification ID2.

Figure 2:
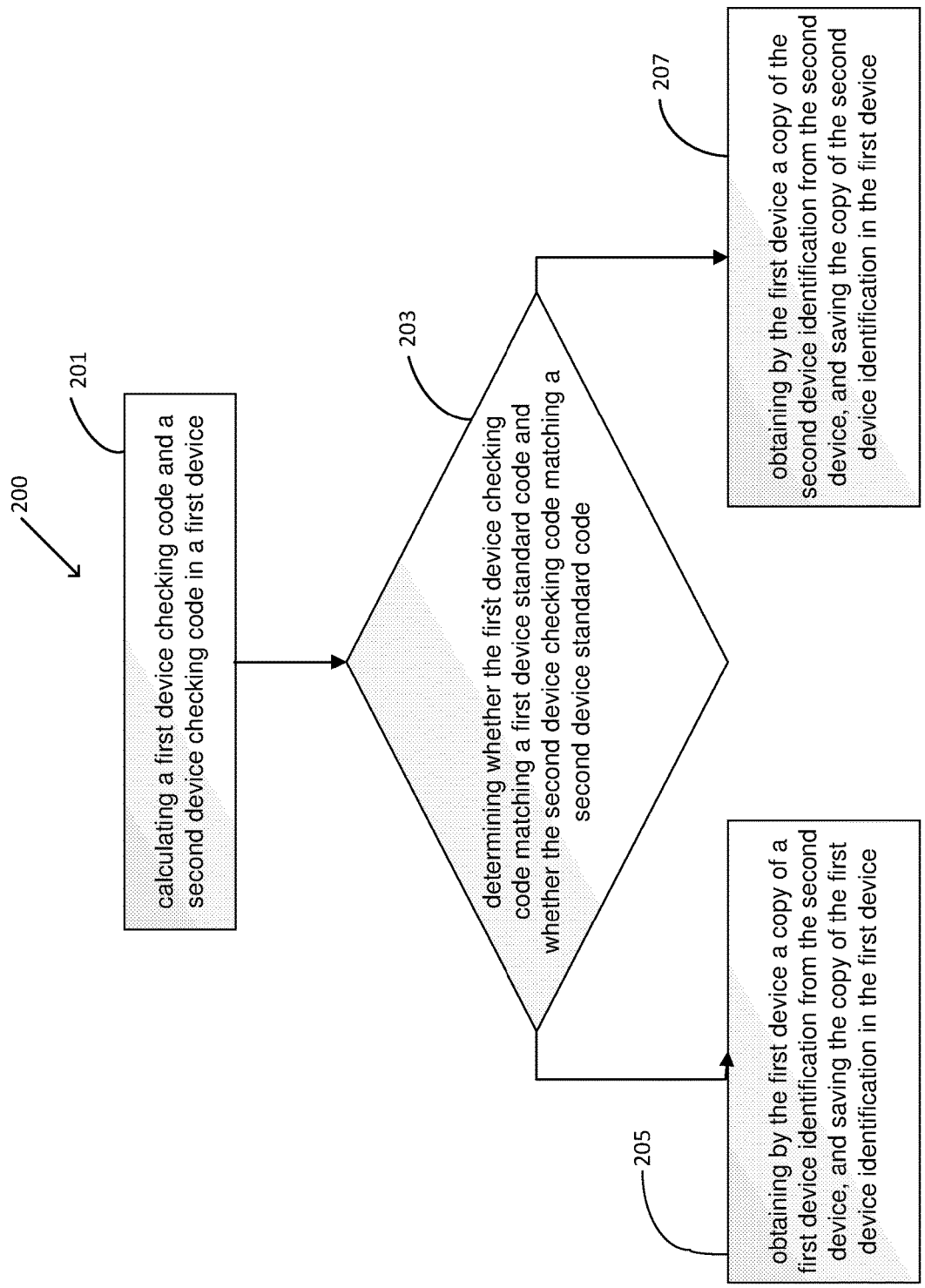
FIG. 2 is a flow chart illustrating a method of recovering pairing information of wirelessly communicated devices according to an embodiment.

FIG. 2 is a flow chart illustrating a method 200 of recovering pairing information of wirelessly communicated devices according to an embodiment of the application.

In an embodiment, the method 200 of recovering wireless pairing information of a mouse 20 and a dongle 30 is provided, in which the mouse 20 and the dongle 30 each stores a mouse identification ID1, a dongle identification ID2, a mouse standard code SC1 initially calculated as a function of the mouse identification ID1 using an algorithm, and a dongle standard code SC2 initially calculated as a function of the dongle identification ID2 using the same algorithm.

At 201, under a condition, the mouse 20 may use the same algorithm to calculate a mouse checking code CC1 as a function of the mouse identification ID1 and a dongle checking code CC2 as a function of the dongle identification ID2. In an embodiment, the condition is satisfied when the mouse 20 detects a motion of the mouse 20 or a pressure on the mouse 20.

At 203, the mouse 20 may determine whether the mouse checking code CC1 matching the mouse standard code SC1 in the mouse 20, and whether the dongle checking code CC2 matching the dongle standard code SC2 in the mouse 20.

At 205, responsive to determining no matching between the mouse checking code CC1 and the mouse standard code SC1 in the mouse 20, the mouse 20 may obtain a copy of the mouse identification ID1 from the dongle 30, and may save the copy of the mouse identification ID1 in the mouse 20.

At 207, responsive to determining no matching between the dongle checking code CC2 and the dongle standard code SC2 in the mouse 20, the mouse 20 may obtain a copy of the dongle identification ID2 from the dongle 30, and may save the copy of the dongle identification ID2 in the mouse 20.

Figure 3:
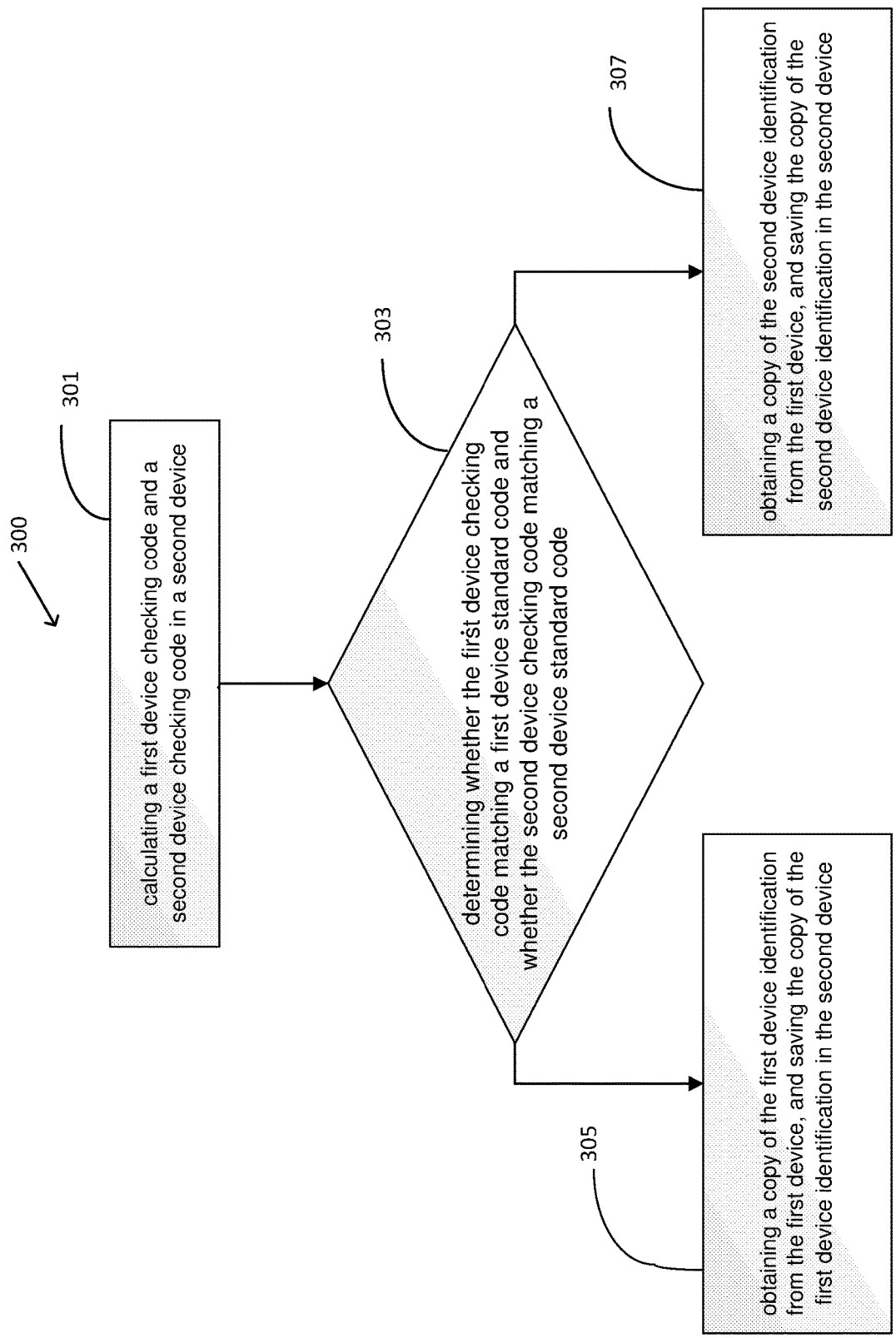
FIG. 3 is a flow chart illustrating a method of recovering pairing information of wirelessly communicated devices according to another embodiment.

FIG. 3 is a flow chart illustrating a method 300 of recovering pairing information of wirelessly communicated devices according to another embodiment of the application.

In an embodiment, the method 300 of recovering wireless pairing information of a mouse 20 and a dongle 30 is provided, in which the mouse 20 and the dongle 30 each stores a mouse identification ID1, a dongle identification ID2, a mouse standard code SC1 initially calculated as a function of the mouse identification ID1 using an algorithm, and a dongle standard code SC2 initially calculated as a function of the dongle identification ID2 using the same algorithm.

At 301, the dongle 30 may use the algorithm to calculate a mouse checking code CC1 as a function of the mouse identification ID1, and a dongle checking code CC2 as a function of the dongle identification ID2.

In an embodiment, the dongle 30 is triggered to periodically calculate the mouse checking code CC1 and the dongle checking code CC2. In another embodiment, responsive to the dongle 30 being linked to an electronic device 40 via a UBS 50, the dongle 30 is triggered to calculate the mouse checking code CC1 and the dongle checking code CC2.

At 303, the dongle 30 may determine whether the mouse checking code CC1 matching the mouse standard code SC1, and whether the dongle checking code CC2 matching the dongle standard code SC2.

At 305, responsive to determining no matching between the mouse checking code CC1 and the mouse standard code SC1, the dongle 30 may obtain a copy of the mouse identification ID1 from the mouse 20, and may save the copy of the mouse identification ID1 in the dongle 30.

At 307, responsive to determining no matching between the dongle checking code CC2 and the dongle standard code SC2, the dongle 30 may obtain a copy of the dongle identification ID2 from the mouse 20, and may save the copy of the dongle identification ID2 in the dongle 30.

The system and the method can automatically determine a pairing information damage in the mouse 20 or in the dongle 30, and can automatically recover the damaged pairing information without even noticed by the user. In this way, the system product having the mouse 20 and the dongle 30 can be less affected by a pairing information damage, and can have extended product life and improved customer experience.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A system comprising:
a first device comprising a first storage; and
a second device comprising a second storage and configured to wirelessly communicate with the first device,
wherein each of the first device and the second device stores
a first device identification,
a second device identification,
a first device standard code calculated as a function of the first device identification by using a calculation algorithm, and
a second device standard code calculated as a function of the second device identification by using the calculation algorithm;
wherein under a condition, the first device is configured to:
calculate, by using the calculation algorithm, a first device checking code as a function of the first device identification, and a second device checking code as a function of the second device identification,
compare the first device checking code with the first device standard code, and compare the second device checking code with the second device standard code,
determine a damage of the first device identification in the first device responsive to determining whether first device checking code matches the first device standard code in the first device, and
determine a damage of the second device identification in the first device responsive to determining whether the second device checking code matches the second device standard code in the first device.

2. The system of claim 1, wherein the first device comprises a mouse, and wherein the second device comprises a dongle.

3. The system of claim 1, wherein the first device comprises the first storage, a first logic circuit, a motion sensor, and a pressure sensor, and wherein the second device comprises the second storage and a second logic circuit.

4. The system of claim 1, wherein under a condition, the first device is configured to determine a damage in one of the first device identification and the second device identification in the first device.

5. The system of claim 4, wherein the condition is satisfied when the first device detects a motion of the first device or a pressure on the first device.

6. The system of claim 4, wherein responsive to determining a damage of the first device identification in the first device, the first device is configured to obtain a copy of the first device identification from the second device, and save the copy of the first device identification in the first device.

7. The system of claim 4, wherein responsive to determining a damage of the second device identification in the first device, the first device is configured to obtain a copy of the second device identification from the second device, and save the copy of the second device identification in the first device.

8. The system of claim 1, wherein the second device is configured to periodically check whether one of the first device identification and the second device identification in the second device is damaged.

9. The system of claim 8, wherein responsive to determining a damage of the first device identification in the second device, the second device is configured to obtain a copy of the first device identification from the first device, and save the copy of the first device identification in the second device.

10. The system of claim 8, wherein responsive to determining a damage of the second device identification in the second device, the second device is configured to obtain a copy of the second device identification from the first device, and to save the copy of the first device identification in the second device.

11. A method of recovering wireless pairing information of a first device and a second device, the first device and the second device each storing a first device identification, a second device identification, a first device standard code calculated as a function of the first device identification using an algorithm, and a second device standard code calculated as a function of the second device identification using the algorithm, the method comprising:
under a condition, using the algorithm by the first device, calculating a first device checking code as a function of the first device identification, and a second device checking code as a function of the second device identification;
determining by the first device whether the first device checking code matches the first device standard code, and whether the second device checking code matches the second device standard code;
responsive to determining no matching between the first device checking code and the first device standard code, obtaining by the first device a copy of the first device identification from the second device, and saving the copy of the first device identification in the first device; and
responsive to determining no matching between the second testing code and the second device standard code, obtaining by the first device a copy of the second device identification from the second device, and saving the copy of the second device identification in the first device.

12. The method of claim 11, wherein the first device comprises a wireless mouse, wherein the second device comprises a wireless dongle.

13. The method of claim 11, wherein the algorithm comprises Cyclic Redundancy Check (CRC).

14. The method of claim 11, wherein the condition is satisfied when the first device detects a motion of the first device or a pressure on the first device.

15. A method of recovering wireless pairing information of a first device and a second device, the first device and the second device each storing a first device identification, a second device identification, a first device standard code calculated as a function of the first device identification using an algorithm, and a second device standard code calculated as a function of the second device identification using the algorithm, the method comprising:

using the algorithm by the second device, calculating a first device checking code of the second device as a function of the first device identification, and a second device checking code of the second device as a function of the second device identification;

determining by the second device whether the first device checking code of the second device matches the first device standard code, and whether the second device checking code matches the second device standard code;

responsive to determining no matching between the first device checking code of the second device and the first device standard code, obtaining by the second device a copy of the first device identification from the first device, and saving the copy of the first device identification in the second device; and responsive to determining no matching between the second checking code of the second device and the second device standard code, obtaining by the second device a copy of the second device identification from the first device, and saving the copy of the second device identification in the second device.

16. The method of claim 15, wherein the second device is linked to an electronic device via a Universal Serial Bus (USB), and is powered by the electronic device.

17. The method of claim 15, wherein the second device is configured to periodically calculate the first device checking code and the second device checking code.

18. The method of claim 15, wherein the second device is configured to calculate the first device checking code and the second device checking code responsive to the second device being linked to an electronic device via a Universal Serial Bus.

19. The method of claim 15, further comprising:

using the algorithm by the first device, calculating a first device checking code of the first device as a function of the first device identification of the first device, and a second device checking code of the first device as a function of the second device identification of the first device;

determining by the first device whether the first device checking code of the first device matching the first device standard code, and whether the second device checking code of the first device matching the second device standard code;

responsive to determining no matching between the first device checking code of the first device and the first device standard code, obtaining by the first device a copy of the first device identification from the second device, and saving the copy of the first device identification in the first device; and responsive to determining no matching between the second testing code of the first device and the second device standard code, obtaining by the first device a copy of the second device identification from the second device, and saving the copy of the second device identification in the first device.

* * * * *